United States Patent Office 3,367,738
Patented Feb. 6, 1968

3,367,738
PROCESS FOR PURIFYING WET PROCESS
PHOSPHORIC ACID WITH ETHYL ETHER
Paul Otto Schallert, College Park, and Charles Clifford Fite, Jr., Atlanta, Ga., assignors to Tennessee Corporation, New York, N.Y., a corporation of Delaware
No Drawing. Filed Sept. 23, 1963, Ser. No. 310,842
The portion of the term of the patent subsequent to May 9, 1984, has been disclaimed
5 Claims. (Cl. 23—107)

This invention relates to improvements in the purification of phosphoric acid and more particularly of wet process phosphoric acid (hereafter referred to as WPA) or any equivalent impure phosphoric acid solution.

In the wet process method for manufacturing phosphoric acid, in which phosphate rock is acidulated with a strong mineral acid, relatively large amounts of impurities are dissolved and accompany the crude acid. These comprise iron, aluminum and calcium as the major metallic impurities, but there are many others in lesser amounts. These impurities do not seriously interfere with the use of this acid in solid mixed fertilizer, but they seriously restrict its use in liquid mixed fertilizer and they prevent use of ths acid in chemical end-products.

Many methods of purifying such acid have been proposed, but due to the character of the impurities and the narrow price differential between this acid and technical grade furnace phosphoric acid, no satisfactory purification method has resulted. Chemical methods are unsatisfactory because the very diverse chemical nature of the impurities requires a number of different chemical steps. Many solvents and solvent extraction processes have been advanced such as use of various alcohols up to $C_6$ or $C_7$ or use of tributyl phosphate or of various other types of solvent. However, all these processes have very serious deficiencies in that the solvents are expensive, that large volumes have to be used, that recovery of solvent is difficult and expensive, that the product acid is much more dilute than the original impure acid, and that some solvents decompose under strenuous conditions such as in distillation from strong acids.

In our prior copending patent application, Ser. No. 248,765, filed Dec. 31, 1962, and entitled, "Process for Purifying Phosphoric Acid," we have disclosed and claimed a new process, based on our discovery of unique and selective properties of diisopropyl ether (IPE) in the system $H_3PO_4$-IPE-$H_2O$, by which WPA can be purified quickly and simply and the above-mentioned deficiencies are avoided.

The present invention provides another solution for the problems of purification of wet process phosphoric acid which was completely unpredictable from any prior art of which we are aware. Diethyl ether, commonly called ethyl ether or merely ether and hereafter referred to as EE, has also been found to possess several very unique and selective properties in solvent extraction purification of this impure acid. This ether extracts $H_3PO_4$ from WPA in high yield leaving a major portion of the impurities behind. The solvent ether is readily removed and recovered leaving a high-strength $H_3PO_4$ of improved purity over the original WPA.

We are aware of literature containing some solubility data on $H_3PO_4$ and ethyl ether, and in one case mutual solubility figures and a phase diagram, but these data were produced from c.p. $H_3PO_4$ and they are totally disparate and incongruous with the results obtained when WPA is used as the acid source. A system of c.p. $H_3PO_4$-$H_2O$-ethyl ether produces only two liquid phases under any conditions, and this system matches the phase diagram just mentioned. A system of WPA-$H_2O$-ethyl ether can produce three liquid phases due to impurities in the WPA, chiefly the metal phosphates which are insoluble in the ether phase, as described below. The phase diagram previously mentioned does not show such a condition of three liquid phases and it is in fact impossible to explain this condition by this phase diagram.

We found that EE extracts $H_3PO_4$ from only that WPA which is higher in $P_2O_5$ than about 39 weight percent $P_2O_5$ (53.8 wt. percent $H_3PO_4$). WPA of lower concentration will not mix with EE nor yield any appreciable amount of its contained $H_3PO_4$ to the ether. Higher concentrations of WPA may be extracted up to practical limits, say 70 wt. percent $P_2O_5$, and the higher the concentration the higher is the percentage of $H_3PO_4$ extracted.

The chemical mechanism of this solvent extraction is not a mere mechanical solubility of $H_3PO_4$ in solvent as in the usual solvent extraction systems. Instead the ether forms a loosely bonded chemical complex with $H_3PO_4$ of the following structure:

$$H_3PO_4 \cdot H_2O \cdot (CH_3CH_2)_2O$$

This complex is a moderately thin liquid which is not appreciably soluble in aqueous, impure phosphoric acid and thus separates out as a liquid phase separate from the aqueous WPA which retains metal phosphates and other impurities. Separation of this complex as a separate liquid phase is due to the impurities as well as to the acid concentration in the WPA. Also, this complex is not appreciably soluble in EE either, so that when excess ether is added, over the that amount required to form the complex, a three liquid phase system appears comprising an extracted aqueous WPA phase, a $H_3PO_4$-EE complex phase, and a free uncomplexed EE phase containing only little $H_3PO_4$.

The complex forms in a mildly exothermic reaction which is readily suppressed by slight cooling to ambient temperature or by precooling of the two influent streams. The complex phase separates readily and cleanly and is subsequently easily split into its component parts by water stripping or by heating to evaporate and remove ether. The resulting phosphoric acid product is of high strength and contains as little as 20% of the original concentration of impurities.

The extracted, impure WPA remaining can be used to very good advantage in manufacturing triple superphosphate fertilizer, or in making 18–46–0 or 16–48–0 grade ammonium phosphates for the fertilizer trade. In these applications the remaining impurities are not objectionables. All three of these products are made in very large quantities from impure WPA.

Another advantageous property of this ether system is its behavior in water stripping of the complex. In the usual solvent systems the pregnant solvent phase is stripped with water, the contained $H_3PO_4$ being removed from the solvent because of preferential solubility of the $H_3PO_4$ in water. The result is that the recovered $H_3PO_4$ is so dilute that reconcentrating it to its original $P_2O_5$ range places an intolerable economic burden on the process.

In contrast, the $H_3PO_4$-EE complex yields its $H_3PO_4$, not by solution of $H_3PO_4$ in water, but by break-up of the complex because of addition of a small proportion of water. As a result, the product $H_3PO_4$ is of only slightly lower concentration than the starting WPA.

Table 1 shows effects, on extraction, of the $P_2O_5$ concentration threshold of this system. For this table, 100 ml. portions of several strengths of WPA were extracted with 100 ml. portions of EE. The results show that the extraction threshold of WPA is 39–40 wt. percent $P_2O_5$, below which level only negligible $P_2O_5$ extraction occurs. The higher the starting concentration of WPA, the greater is extraction efficiency, restricted only by limiting factors of volumes, of viscosities, and of desired purification.

In this table, volume of complex phase decreases with WPA concentration. The $P_2O_5$ proportion in the complex phase is relatively fixed; the actual concentration decreases because of presence of free, uncomplexed ether which is slightly soluble in the complex phase. From 39.6 wt. percent WPA, there is essentially no complex formed and very little $H_3PO_4$ is extracted; extraction in this instance is merely simple solubility, rather than complex formation.

Table 3 shows results of a similar comparison of extracting 54 wt. percent $P_2O_5$ WPA with increasing volumes of ether. Again it is seen that the WPA can be reduced only to a given level of $P_2O_5$ concentration. As there is more $P_2O_5$ present above this level than is the case with 46 wt. percent $P_2O_5$ WPA, naturally more ether is used to remove and complex it. The table indicates that the optimum ether level is slightly over 2 volumes per volume of 54 wt. percent $P_2O_5$ WPA. At this level around 84% of contained $P_2O_5$ can be extracted.

TABLE 3.—VOLUMES OF ETHER AS AFFECTING EXTRACTION OF 54 WT. PERCENT $P_2O_5$ WPA

| Volume | | WPA after Extraction $P_2O_5$, Wt. Percent | Complex Phase | | | | Free Ether Phase | |
|---|---|---|---|---|---|---|---|---|
| WPA, ml. | Ether, ml. | | Vol. ml. | $P_2O_5$, Wt. Percent | $P_2O_5$ Extrac'n., Percent | $P_2O_5$ Conc'n. Solv-free, Wt. Percent | Vol., ml. | $P_2O_5$ Conc'n., Wt. Percent |
| 100 | 100 | 45.4 | 166 | 38.5 | 81.8 | 57.7 | 0 | -- |
| 100 | 200 | 41.8 | 257 | 28.8 | 83.5 | 58.5 | 0 | -- |
| 100 | 300 | 41.0 | 287 | 25.8 | 80.8 | 58.1 | 67 | 4.6 |

TABLE 1.—$P_2O_5$ CONCENTRATION AS AFFECTING EXTRACTION

| WPA Concentration, wt. Percent $P_2O_5$ | | Complex Phase | | |
|---|---|---|---|---|
| Before Extraction | After Extraction | Volume, ml. | $P_2O_5$ Conc'n. wt. Percent | $P_2O_5$ Extraction, Percent |
| 54.6 | 45.4 | 166 | 38.5 | 81.8 |
| 44.9 | 42.6 | 123 | 31.5 | 59.0 |
| 44.0 | 41.9 | 117 | 29.1 | 47.0 |
| 39.6 | 39.1 | 101 | 3.1 | 2.7 |

Table 2 shows results of treating 46 wt. percent $P_2O_5$ WPA with various volumes of ether. In each case 200 ml. of the WPA were taken, and this was treated with 200, 400 or 600 ml. of ether. Results in this table show again that the extraction threshold of WPA is 39–40 wt. percent $P_2O_5$, and this cannot be appreciably lowered even with large excesses of ether. This is further evidence that $H_3PO_4$ extraction in our system is not a mere simple solubility; if it were, increased volumes of ether would show proportionately increased removal of $H_3PO_4$.

This table shows that there is a definite combining proportion between the extracted $H_3PO_4$ and ether, as shown by the essentially constant volume and concentration of the complex phase, and by the fact that excess ether, over the complex combining proportions, merely forms a third liquid phase containing a very low proportion of $P_2O_5$. We found that, with 1—1 volumes of 46 wt. percent WPA and ether, we were on the threshold of satisfying the complex and that ether over this proportion goes to the free ether phase. This phenomenon is an accurate gauge to determine that the given WPA, of whatever strength, is fully extracted.

Table 4 shows results of extractions at two different temperatures, all other conditions being identical. In each case 200 ml. of WPA was mixed with 200 ml. of ether. The first test was done with both WPA and ether at room temperature, approximately 20° C., maintained by cooling. The second test was done at 38° C., by using pressure equipment. This table shows that at higher temperatures over the boiling point of the ether, there is lower yield, and poorer purification.

TABLE 4.—TEMPERATURE AS AFFECTING EXTRACTION OF 46 WT. PERCENT $P_2O_5$ WPA

| Temp., ° C. | Complex Phase | | | |
|---|---|---|---|---|
| | Vol., ml. | $P_2O_5$, Wt. Percent | $P_2O_5$ Extrac'n., percent | Impurity Content, ratio-percent original |
| 20 | 256 | 31.1 | 64.6 | 13.0 |
| 38 | 198 | 34.6 | 55.0 | 20.4 |

Recovery of the complexed $H_3PO_4$ further demonstrates the special properties of this system. Table 5 shows results of adding increments of water to a $H_3PO_4$-EE complex which originally analyzes 38.4 wt. percent $P_2O_5$. The first increments of water added are soluble in this complex. When 40 ml. of water has been added, a free ether phase appears from breakup of the complex. From this point, this free ether phase increases rapidly in volume, and the $H_3PO_4$-complex turns rapidly into a $H_3PO_4$-$H_3O$ phase. The stripping end-point is at 80 ml. of water added, or 40% on the original 200 ml. of complex. The $H_3PO_4$ product at this point is 35.5 wt. percent $P_2O_5$ and contains yet a very little dissolved ether. The impurity level is as low as 20% of original, thus a substantial improvement has resulted.

TABLE 2.—VOLUMES OF ETHER AS AFFECTING EXTRACTION OF 46 WT. PERCENT $P_2O_5$ WPA

| Volume | | WPA after Extraction $P_2O_5$, Wt. Percent | Complex Phase | | | | Free Ether Phase | |
|---|---|---|---|---|---|---|---|---|
| WPA, ml. | Ether, ml. | | Vol. ml. | $P_2O_5$, Wt. Percent | $P_2O_5$ Extrac'n., Percent | $P_2O_5$ Conc'n. Solv-free, Wt. Percent | Vol., ml. | $P_2O_5$ Conc'n., Wt. Percent |
| 200 | 200 | 39.5 | 246 | 30.5 | 53.6 | 50.6 | 0 | -- |
| 200 | 400 | 40.1 | 237 | 29.1 | 53.7 | 49.6 | 235 | 2.3 |
| 200 | 600 | 39.7 | 234 | 27.1 | 50.2 | 51.4 | 440 | 2.9 |

TABLE 5.—WATER STRIPPING OF $H_3PO_4$-EE COMPLEX

| $H_3PO_4$-EE Complex | | Water Added | | Resulting Phases | | | |
|---|---|---|---|---|---|---|---|
| | | | | $H_3PO_4$-EE Complex, vol., ml. | $H_3PO_4$-$H_2O$ Product | | Free Ether Vol., ml. |
| Vol., ml. | $P_2O_5$ wt. percent | Increment, ml. | Total, ml. | | Vol., ml. | $P_2O_5$, wt. percent | |
| 200 | 38.4 | 0 | 0 | 200 | 0 | 0 | 0 |
| | | 10 | 10 | 209 | 0 | 0 | 0 |
| | | 10 | 20 | 218 | 0 | 0 | 0 |
| | | 10 | 30 | 227 | 0 | 0 | 0 |
| | | 10 | 40 | ---------- | 233 | 29.2 | 3 |
| | | 10 | 50 | ---------- | 214 | 31.9 | 30 |
| | | 10 | 60 | ---------- | 198 | 34.4 | 55 |
| | | 10 | 70 | ---------- | 189 | 36.0 | 72 |
| | | 10 | 80 | ---------- | 192 | 35.5 | 78 |
| | | 10 | 90 | ---------- | 202 | 33.7 | 78 |

Instead of water stripping, the $H_3PO_4$-EE complex can be subjected directly to distillation to evolve the ether which is condensed and recycled. This course presents certain economies as the ether, because of its very low boiling point, evolves readily, and when all evolved leaves an aqueous product of approximately 59 wt. percent $P_2O_5$, which is actually higher in concentration than the starting crude WPA.

We have found also that desulfation of WPA before extraction produces a product $H_3PO_4$ of appreciably lower impurity content, especially with regard to the chief metal impurities, iron, aluminum, and calcium. These may thus appear in the final $H_3PO_4$ product at a level of only perhaps 15–40% of original. The desulfation may be done in known ways by adding calcium or barium salts or the like to precipitate calcium sulfate, or by adding superphosphate which is essentially calcium phosphate.

The following examples illustrate the results obtained in practice by use of processes embodying the invention. In each of these examples, analysis of the starting WPA is given as a typical or representative set of figures. It is well known that composition of WPA varies widely between different producers and between different times in the same plant.

*Example 1.*—To a 500 ml. separatory funnel was added 200 ml. (309 g.) of 46 wet. percent $P_2O_5$ WPA acidulation acid of the composition shown following in Table 6. The funnel was cooled in running water with shaking, and 200 ml. ethyl ether was added in increments with continued cooling and agitation. After standing about 15 minutes, a bottom dark layer of about 100 ml. was drawn off which comprised the aqueous extracted WPA. The remaining light amber colored layer of approximately 250 ml. was the $H_3PO_4$-EE complex layer. To this was added 100 ml. of water with shaking, whereupon two liquid layers formed, one being the aqueous acid product and the other the free EE. The data are given following.

TABLE 6.—EXTRACTION OF ACIDULATION GRADE WPA

| | Grams | $P_2O_5$ wt. percent | Fe, wt. percent | Al, wt. percent | EE, wt. percent |
|---|---|---|---|---|---|
| Original WPA | 309 | 46.9 | 1.08 | 0.27 | 0 |
| Extracted WPA | 149 | 39.5 | 1.98 | 0.35 | 4 |
| Aqueous Purified Acid | 277 | 31.3 | 0.29 | 0.19 | 6 |

Essentially 95% of the ether was recovered by volatilizing from the above aqueous fractions by heating these to approximately 110° C.

*Example 2.*—To a 500 ml. separatory funnel was added 100 ml. (169 g.) of shipping grade WPA, 54 wt. percent $P_2O_5$. The funnel was cooled with cold tap water and 300 ml. of EE was added in increments with continued cooling and agitation. After about 5 minutes, three liquid layers had formed, the top one being about 65 ml. of free uncomplexed ether, presence of this being a good indication that the WPA is extracted as completely as it can be and that the complex proportions are fully satisfied. The bottom dark layer of about 22 ml., being the residual extracted aqueous WPA, was drawn off. The next layer up, of approximately 287 ml., was light amber colored $H_3PO_4$-EE complex. This was in turn drawn off and shaken with 115 ml. of water, whereupon two liquid layers immediately formed. The lower of these was the aqueous $H_3PO_4$ product which was drawn off and analyzed. Data are given following.

TABLE 7.—EXTRACTION OF SHIPPING GRADE WPA

| | Grams | $P_2O_5$, wt. percent | Fe, wt. percent | Al, wt. percent | EE, wt. percent |
|---|---|---|---|---|---|
| Original WPA | 169 | 54.6 | 1.38 | 0.63 | 0 |
| Extracted WPA | 37.4 | 41.0 | 4.54 | 0.80 | |
| Aqueous Purified Acid | 235 | 32.7 | 0.45 | 0.30 | 3 |

*Example 3.*—A 100 ml. portion of 46 wt. percent $P_2O_5$ acidulation grade WPA was treated with 12 grams of finely divided triple superphosphate at 100° C. The acid was cooled to ambient temperature, settled and separated, and the supernatant liquid was extracted as in Example 1. The triple superphosphate precipitated most of the sulfate as gypsum, and in the following ether extraction there were fewer impurities extracted. The following results were obtained—

Aqueous purified acid:

Grams _____ 135
    $P_2O_5$ _____wt. percent__ 31.0
    Fe _____do____ 0.19
    Al _____do____ 0.16

The process can operate successfully as an industrial unit just as portrayed in our FIGURE 1 in our copending aforementioned patent application Ser. No. 248,765, with the provision that proportionately less ethyl ether would be needed because of the higher capacity of this ether for $H_3PO_4$. However, there can be many modifications of the basic process depending on starting materials and end-products desired. For instance, it may be desirable to use a mixture of ethyl ether according to the present invention and of isopropyl ether according to said patent application Ser. No. 248,765. Similarly, by extracting a smaller proportion of $H_3PO_4$ from any given WPA, the purity of the product $H_3PO_4$ may be improved. Also, it will be obvious to anyone skilled in the art that the $H_3PO_4$-Ether complex of whatever origin may be directly ammoniated with gaseous or liquid ammonia or ammonia solution or other alkali to give a highly concentrated ammonium phosphate. All such modifications and others are envisioned in the concept of this invention, and it is to be understood that the invention is not restricted to the details of the foregoing description and that reference should be had to the appended claims for a definition of its limits.

What is claimed is:
1. A process for the purification of phosphoric acid which comprises contacting aqueous impure phosphoric acid of concentration about 39 wt. percent $P_2O_5$ to about 62 wt. percent $P_2O_5$, with diethyl ether, forming an aqueous impure acid phase and a purified acid-water-ether complex phase, separating said two liquid phases, and recovering said ether and a purified acid from said complex phase.
2. The process of claim 1, wherein the impure phosphoric acid is wet process phosphoric acid of 39–62 wet percent $P_2O_5$ content and the amount of diethyl ether is that required to form the desired amount of complex or 0.5 to 1.5 parts by weight of ether to weight of the wet process phosphoric acid.
3. The process of claim 1, wherein the ether is recovered from the complex by distillation.
4. The process of claim 1 in which the ether is recovered by diluting the complex phase with water to produce a phase separation between ether and the product acid.
5. The process of claim 1 in which the ether complex phase is treated with a base to precipitate the phosphoric acid as phosphate and to free the ether.

References Cited

UNITED STATES PATENTS

| | | | |
|---|---|---|---|
| 2,880,063 | 3/1959 | Baniel et al. | 23—165 |
| 1,968,544 | 7/1934 | Vana | 23—312 |
| 1,981,145 | 11/1934 | Keller | 23—165 |
| 2,493,915 | 1/1950 | Cross | 23—165 |

OTHER REFERENCES

Zharovskii et al.: Chem. Abstracts. vol. 57, p. 1625F (1961).

MILTON WEISSMAN, *Primary Examiner.*

OSCAR R. VERTIZ, *Examiner.*

O. F. CRUTCHFIELD, A. GREIF, *Assistant Examiners.*

UNITED STATES PATENT OFFICE
CERTIFICATE OF CORRECTION

Patent No. 3,367,738                                                 February 6, 1968

Paul Otto Schallert et al.

It is hereby certified that error appears in the above numbered patent requiring correction and that the said Letters Patent should read as corrected below.

Column 4, lines 1 and 2, strike out "is merely simple solubility, rather than complex formation." and insert the same after "instance" in column 3, line 12; column 4, line 56, for "$H_3PO_4-H_3O$" read -- $H_3PO_4-H_2O$ --; column 5, line 45, for "wet." read -- wt. --; column 6, TABLE 7, last column, lines 1, 2 and 3 should read -- 0 --, --3 --, and -- 7 --; column 7, line 13, for "wet", second occurrence, read -- wt. --.

Signed and sealed this 1st day of April 1969.

(SEAL)
Attest:

Edward M. Fletcher, Jr.                                     EDWARD J. BRENNER
Attesting Officer                                                    Commissioner of Patents